(12) United States Patent
Lesh et al.

(10) Patent No.: US 11,168,826 B2
(45) Date of Patent: Nov. 9, 2021

(54) MIST CAPTURE DEVICE FOR HYDRAULIC FITTING

(71) Applicant: The Boeing Company, Chicago, IL (US)

(72) Inventors: John R. Lesh, Woodinville, WA (US); Sean O'Connor, Poulsbo, WA (US); Alan B. Bartlett, Mukilteo, WA (US); Alexandra M. White, Seattle, WA (US)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 16/057,098

(22) Filed: Aug. 7, 2018

(65) Prior Publication Data

US 2020/0049298 A1    Feb. 13, 2020

(51) Int. Cl.
*F16L 55/07* (2006.01)
*F16L 15/00* (2006.01)

(52) U.S. Cl.
CPC .......... *F16L 55/07* (2013.01); *F16L 15/006* (2013.01)

(58) Field of Classification Search
CPC ....... F16L 15/006; F16L 55/07; B67D 7/3209
See application file for complete search history.

(56) References Cited

U.S. PATENT DOCUMENTS

| 327,996 | A | * | 10/1885 | Brick | F16L 23/167 285/13 |
| 333,413 | A | * | 12/1885 | Hoeveler | F16L 23/167 285/13 |
| 345,463 | A | * | 7/1886 | Verner | F16L 23/167 285/13 |
| 347,084 | A | * | 8/1886 | Blackmore | F16L 35/00 285/45 |
| 3,008,363 | A | * | 11/1961 | Cook | B25B 13/48 81/124.3 |
| 3,661,041 | A | * | 5/1972 | Welz | B25B 13/107 81/98 |
| 5,819,708 | A | * | 10/1998 | Buratti | F02M 55/002 123/468 |
| 5,911,155 | A | * | 6/1999 | Webb | F16L 39/00 137/314 |
| 6,789,584 | B2 | * | 9/2004 | Linam | F16L 19/00 137/15.11 |
| 10,316,996 | B2 | * | 6/2019 | Wollaston | F16L 19/005 |
| 2012/0242077 | A1 | * | 9/2012 | Shraga | F16L 35/00 285/39 |
| 2014/0131991 | A1 | * | 5/2014 | Bellis | F16L 35/00 285/13 |

FOREIGN PATENT DOCUMENTS

JP        2000263456 A  *  9/2000

* cited by examiner

*Primary Examiner* — Matthew Troutman
*Assistant Examiner* — James A Linford
(74) *Attorney, Agent, or Firm* — Duft & Bornsen, PC

(57) ABSTRACT

A mist capture device for a hydraulic fitting. In one embodiment, the mist capture device includes a plurality of bodies configured to fit together to form an assembled body around the hydraulic fitting. The mist capture device also includes an internal socket surface formed inside the assembled body configured to engage the hydraulic fitting. The mist capture device further includes a mist enclosure formed inside the assembled body configured to capture hydraulic fluid spraying from the hydraulic fitting as the hydraulic fitting is rotated via the internal socket.

20 Claims, 5 Drawing Sheets

MIST CAPTURE DEVICE FOR HYDRAULIC FITTING

FIELD

This disclosure relates to hydraulic fittings, and more particularly, to hydraulic fittings for an aircraft.

BACKGROUND

A "B-nut" is a type of hydraulic fitting commonly used in aircraft hydraulic systems to connect fluid lines with a reliable seal. As part of routine maintenance and servicing operations of the aircraft, aircraft technicians may disconnect B-nuts to bleed the fluid lines and release air trapped in the hydraulic fluid. Unfortunately, it is difficult to loosen B-nuts without exposing aircraft surfaces to hydraulic fluid.

SUMMARY

Embodiments described herein provide a mist capture device for a hydraulic fitting. The mist capture device fits over a B-nut of a hydraulic fitting to simultaneously rotatably loosen the B-nut and provide a sealed container that surrounds the immediate environment of the B-nut for hydraulic fluid spraying out a side of the B-nut as a result of its loosening from the hydraulic fitting. The mist capture device may direct air and fluid escaping from the B-nut into its container to an external device such as a filter or fluid tank, thereby improving the execution and safety of aircraft hydraulic system maintenance operations.

One embodiment is a mist capture device for a hydraulic fitting. In one embodiment, the mist capture device includes a plurality of bodies configured to fit together to form an assembled body around the hydraulic fitting. The mist capture device also includes an internal socket surface formed inside the assembled body configured to engage the hydraulic fitting. The mist capture device further includes a mist enclosure formed inside the assembled body configured to capture hydraulic fluid spraying from the hydraulic fitting as the hydraulic fitting is rotated via the internal socket.

Another embodiment is an apparatus including a body to assemble around a B-nut of a hydraulic fitting, an internal socket inside the body to engage wrench flats of the B-nut for rotation, and a mist enclosure adjacent to the internal socket inside the body to capture hydraulic fluid spraying out a side of the B-nut as the B-nut is loosened via rotation of the internal socket. In some embodiments, the apparatus includes a circular void at one end of the body that surrounds tubing engaged by the B-nut to enclose the mist enclosure over the side of the B-nut.

Yet another embodiment is a mist capture device for a B-nut hydraulic fitting including a B-nut, a fitting, and tubing sealed by the B-nut and the fitting. The mist capture device includes a two-part body configured to fit together around the B-nut. The two-part body forms: a first circular void to fit around a collar between the fitting and a first side of the B-nut, an internal socket surface to engage the B-nut for rotation, a mist enclosure encapsulating an area facing a second side of the B-nut, and a second circular void to fit around the tubing.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1A:
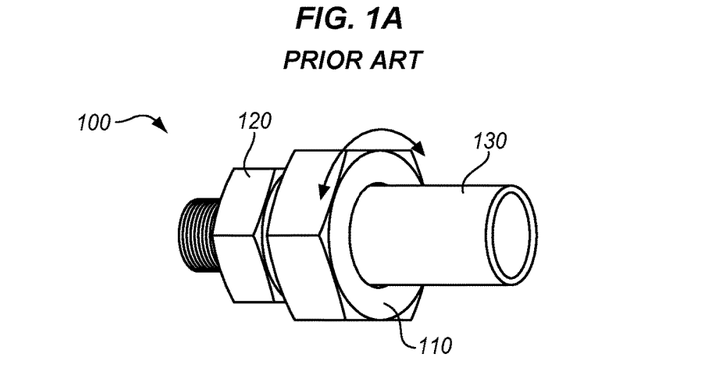
FIG. 1A is a perspective view of a B-nut fitting.

FIG. 1A is a perspective view of a B-nut fitting 100. The B-nut fitting 100 includes a B-nut 110 and a fitting 120 configured to mechanically engage one another to fluidly couple tubing 130 of a hydraulic system. As indicated by the directional arrows, the B-nut 110 may be rotationally tightened or loosened with respect to the fitting 120. When properly tightened and engaged, the B-nut 110 and the fitting 120 fluidly join two or more hydraulic components by sealing the tubing 130 in the B-nut fitting 100. The configuration of the B-nut fitting 100 may generally seal a connection point to prevent fluid leaks even at relatively high levels of fluid pressure and vibration. The B-nut fitting 100 is thus suitable for use at various locations throughout a hydraulic system of an aircraft.

Figure 1B:
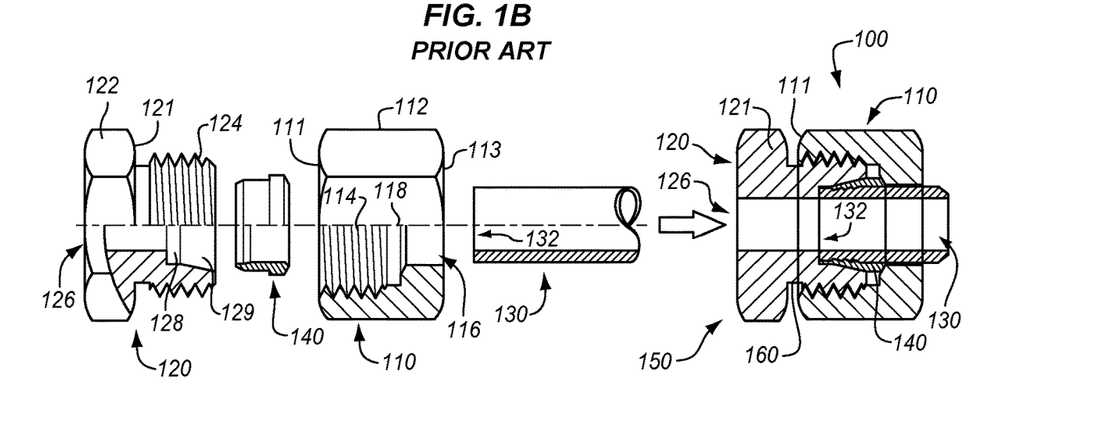
FIG. 1B is a half-section view of components of the B-nut fitting which may be mated together into an engaged position.

FIG. 1B is a half-section view of components of the B-nut fitting 100 which may be mated together into an engaged position 150. The fitting 120 may include a fitting head 122 with wrench flats, a threaded shank 124 extending from the fitting head 122, a fitting channel 126 extending therethrough, a counterbore shoulder 128, and a tapered throat 129. The B-nut 110 may include a wrench surface 112 (e.g., hexagonal outer surface), an internal screw thread 114, a nut channel 116, and a base 118. Additionally, the B-nut fitting 100 may use a connector sleeve 140 to fluidly connect the tubing 130.

Generally, to begin engagement, the B-nut 110 is placed over a tube end 132 of the tubing 130 followed by the connector sleeve 140. The tube end 132 is pressed into engagement with the counterbore shoulder 128 of the fitting 120. With components properly oriented and aligned, the B-nut 110 may be rotated onto the fitting 120 via the internal screw thread 114 and the threaded shank 124. The rotation causes the base 118 of the B-nut 110 to press the connector sleeve 140 into the tapered throat 129 of the fitting 120. The angle of the tapered throat 129 causes the connector sleeve 140 to clamp the outer surface of the tubing 130, thereby sealing the tubing 130 as the B-nut 110 is tightened. As such, the B-nut fitting 100 is able to fluidly connect the fitting 120 and its associated hydraulic components with the tubing 130 and its associated hydraulic components.

Generally, as the B-nut 110 is tightened to the engaged position 150, the fitting channel 126, the nut channel 116, and the tubing 130 form a continuous sealed channel for transporting hydraulic fluid. Additionally, depending on component lengths and styles, the engaged position 150 of the B-nut fitting 100 may expose a collar 160 extending between the fitting 120 and the B-nut 110. The horizontal space between a shoulder 121 of the fitting head 122 and a first side 111 of the B-nut 110 defines the exposed length of the collar 160. Generally, a second side 113 of the B-nut 110 opposite the first side 111 expels hydraulic fluid as the B-nut 110 is disengaged from the fitting 120. Though a particular configuration of the B-nut fitting 100 is shown and described for purposes of discussion, it will be appreciated that embodiments described herein may apply to numerous variations thereof, including flared or flareless joint connections, compression-type fittings, variations in the connector sleeve 140 such as cutting rings, tube nipples, O-rings, and/or hose ends to provide the seal, mating styles incorporating swivel nuts, etc.

Figure 1C:
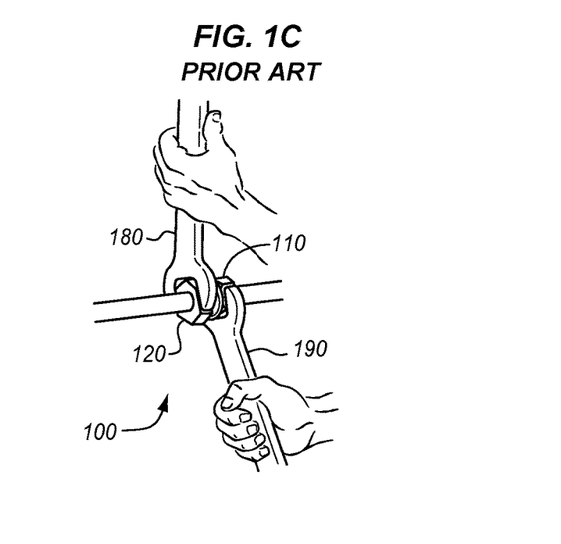
FIG. 1C illustrates disconnecting the B-nut fitting.

FIG. 1C illustrates disconnecting the B-nut fitting 100. Generally, the B-nut fitting 100 is loosened by an aircraft technician using a first wrench 180 to hold the fitting 120 in place while rotating the B-nut 110 with a second wrench 190. Since hydraulic fluid tends to mist or spray as the B-nut fitting 100 is loosened, the aircraft technician may also hold a rag with the second wrench 190 in attempt to mitigate potential aircraft component damage, surface/health hazards, and post-service cleanup resulting from expelled hydraulic fluid (e.g., Skydrol). Although the wrench and rag technique can lessen hydraulic fluid exposure, it is generally difficult to perform with complete accuracy on a consistent basis and the condensed mist may still drip from the rag near the aircraft worksite. Thus, aircraft maintenance that involves hydraulic fluid bleeding may involve non-scheduled cleanup work which interrupts maintenance operations.

Figure 2:
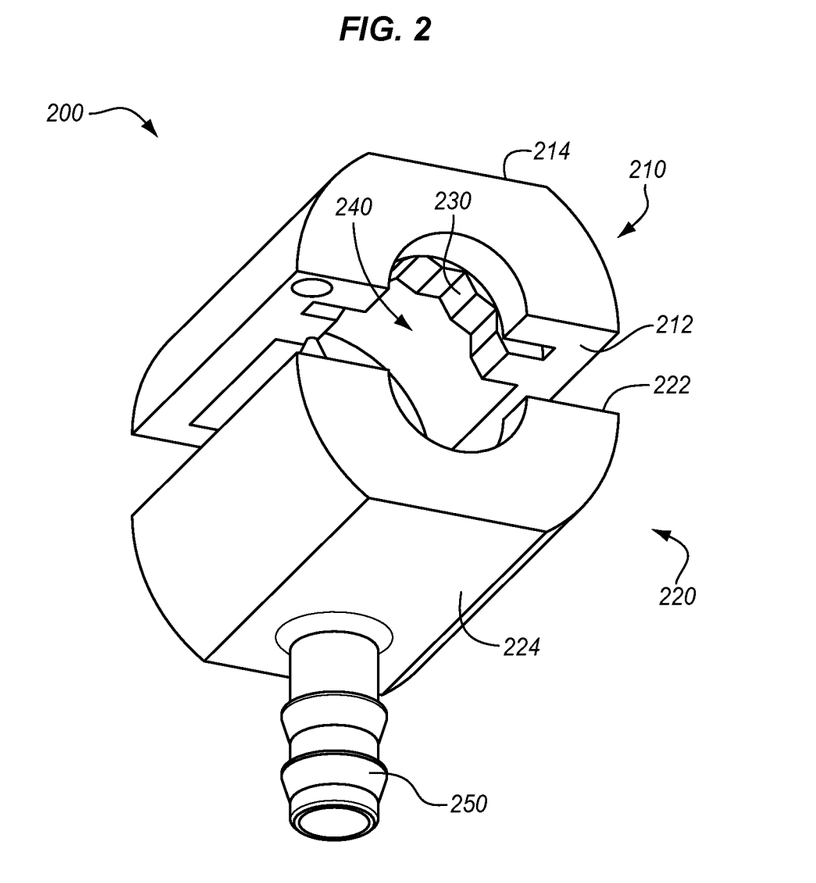
FIG. 2 illustrates a mist capture device for the B-nut fitting in an illustrative embodiment.

FIG. 2 illustrates a mist capture device 200 for the B-nut fitting 100 in an illustrative embodiment. The mist capture device 200 addresses the above-described problems associated with loosening hydraulic fittings in an aircraft. The mist capture device 200 includes an upper body 210 and a lower body 220 configured to detachably engage one another around the B-nut fitting 100. When an upper joining surface 212 of the upper body 210 and a lower joining surface 222 of the lower body 220 are properly aligned and mated together, the mist capture device 200 forms an internal socket surface 230 configured to engage the B-nut 110 of the B-nut fitting 100 for rotation. Furthermore, an upper wrench flat 214 of the upper body 210 and a lower wrench flat 224 of the lower body 220 form parallel flat surfaces for engaging the mist capture device 200 with a hand tool such as a wrench. Thus, the mist capture device 200 advantageously enables a user, such as an aircraft hydraulic technician, to easily loosen the B-nut 110 captive inside the mist capture device 200.

Additionally, with the upper body 210 and the lower body 220 engaged, the mist capture device 200 forms a mist enclosure 240 that surrounds the B-nut 110 to capture the spray or mist of hydraulic fluid discharging from the B-nut fitting 100 while the B-nut 110 is loosening. The mist capture device 200 also includes a drain connector 250 to direct the captured hydraulic fluid in the mist enclosure 240 to a hydraulic fluid filter or collection device (not shown). For instance, the drain connector 250 may include a barbed hose fitting to direct hydraulic fluid captured by the mist enclosure 240 to a larger external fluid tank connected to the barbed hose fitting via a hose.

Advantageously, the mist capture device 200 enables loosening of the B-nut fitting 100 while eliminating the risk of undesirable hydraulic fluid exposure to aircraft components and work surfaces which may otherwise potentially result from fluid spray, mist, or rag drip. Moreover, the mist capture device 200 improves maintenance operations by enabling an aircraft mechanic to use one hand (or wrench) to loosen the B-nut 110 and the other hand (or wrench) to hold the fitting 120 without incorporating a rag, thereby decreasing the risk of wrench slippage. Thus, maintenance procedures of an aircraft hydraulic system may be performed with the technical benefit of eliminating hydraulic fluid spray or drip, reducing potential safety and health hazards, and facilitating proper waste disposal of a hydraulic fluid.

Figure 3A:
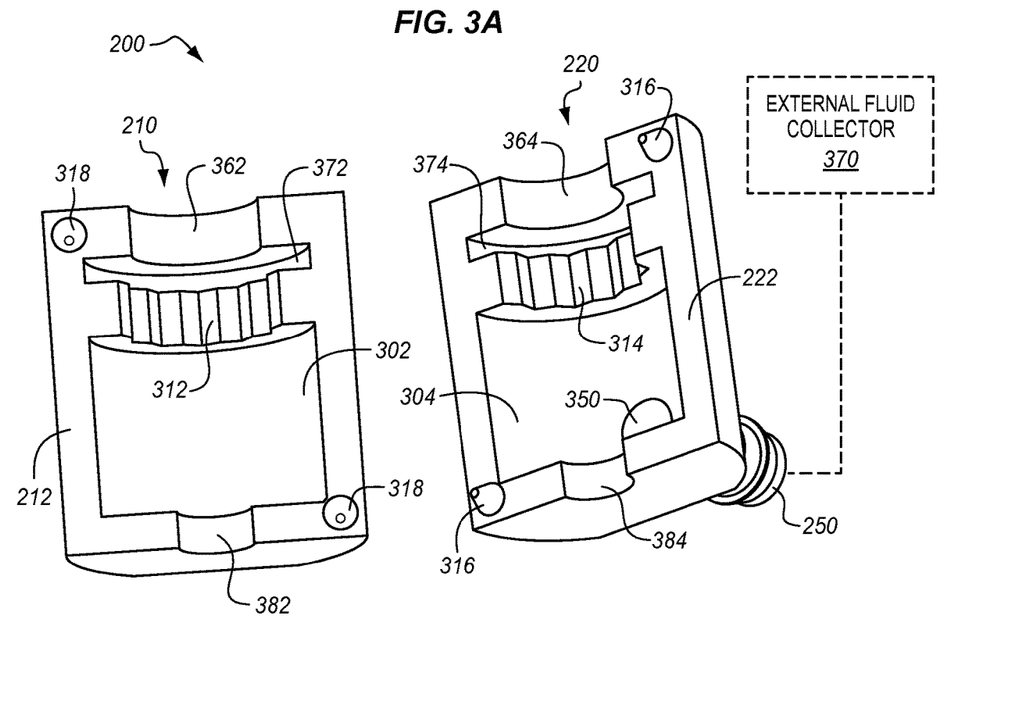
FIG. 3A is a perspective view of the mist capture device in a disassembled position in an illustrative embodiment.

FIG. 3A is a perspective view of the mist capture device 200 in a disassembled position in an illustrative embodiment. The mist capture device 200 includes a plurality of rigid bodies (e.g., metal, plastic, etc.) configured to fit together to form an assembled body around the B-nut fitting 100. The upper body 210 and the lower body 220 have corresponding mist enclosure portions 302-304 and internal socket portions 312-314. Thus, with the mist capture device 200 in an assembled position with the upper joining surface 212 and the lower joining surface 222 aligned and abutting each other, the mist enclosure portions 302-304 align to form the mist enclosure 240 and the internal socket portions 312-314 align to form the internal socket surface 230.

Additionally, to secure the upper body 210 and the lower body 220 together for rotating the B-nut fitting 100, the upper joining surface 212 and the lower joining surface 222 may include corresponding index pins 316 and mounting notches 318 for detachable engagement. As shown by this example, the index pins 316 may include tapered or conical protrusions on the lower joining surface 222 sized to fit into the mounting notches 318 having correspondingly shaped and located voids on the upper joining surface 212. Thus, a technical benefit is provided in that the temporary joining of the upper body 210 and the lower body 220 is sufficiently secure to prevent inadvertent disassembly during use of the mist capture device 200 while remaining convenient to pull or separate apart after use.

To facilitate proper alignment and secure engagement of the upper body 210 and the lower body 220, the index pins 316 may be disposed on multiple sides of the lower joining surface 222 (e.g., two index pins 316 at opposing sides or corners of the lower joining surface 222 from one another). In that case, the mounting notches 318 may be similarly disposed on opposing sides or corners of the upper joining surface 212. Alternatively or additionally, one or more index pins 316 may protrude from the upper joining surface 212 to plug into one or more mounting notches 318 (or holes) in the lower joining surface 222. In some embodiments, the upper joining surface 212 and the lower joining surface 222 are interfacing flat surfaces that define an internal perimeter of the mist capture device 200 where it splits. Accordingly, the protrusions and voids of the index pins 316 and the mounting notches 318 may extend lengthwise in a direction parallel to one another and perpendicular to the upper joining surface 212 and the lower joining surface 222.

The lower body 220 also includes a drain hole 350 in its mist enclosure portion 304. The drain hole 350 provides an opening into the hollow channel of the drain connector 250 extending from the outer surface of the lower body 220. Accordingly, the mist capture device 200 is configured to transport hydraulic fluid captured in the mist enclosure 240 to an external fluid collector 370 (e.g., hydraulic fluid filter, tank, etc.) while actively engaged with the B-nut fitting 100.

The upper body 210 and the lower body 220 further include corresponding collar engagement portions 362-364, B-nut shoulder engagement portions 372-374, and tube engagement portions 382-384. As described in greater detail below, with the mist capture device 200 assembled around the B-nut fitting 100, the collar engagement portions 362-364 connect around the collar 160 of the B-nut fitting 100 and the B-nut shoulder engagement portions 372-374 form a groove for the shoulder of the B-nut 110 to prevent the mist capture device 200 from slipping off the B-nut 110. Additionally, the tube engagement portions 382-384 connect around the tubing 130 to sufficiently enclose the mist enclosure 240 to prevent hydraulic fluid escaping into the external environment.

Figure 3B:
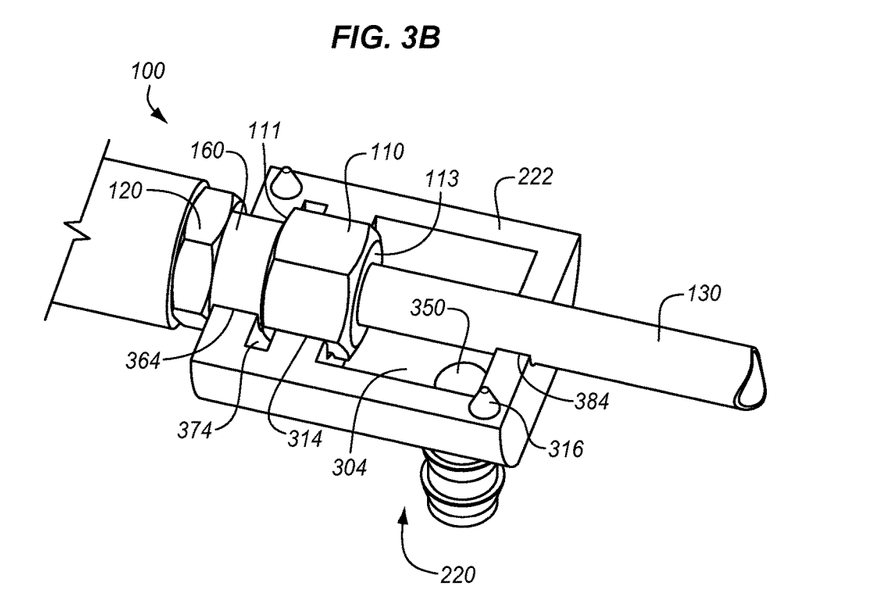
FIG. 3B is a top perspective view of the lower body of the mist capture device engaged with the B-nut fitting in an illustrative embodiment.

FIG. 3B is a top perspective view of the lower body 220 of the mist capture device 200 engaged with the B-nut fitting 100 in an illustrative embodiment. As shown by this example, the collar engagement portion 364, the B-nut shoulder engagement portion 374, and the internal socket portion 314 are sized to appropriately engage the collar 160 and the B-nut 110 of the B-nut fitting 100. In particular, the collar engagement portion 364 may form a semi-circular recess in the lower joining surface 222 sized to fit the collar 160. Thus, the collar engagement portion 364 may form a portion of a circular void that surrounds the collar 160 at a first side 111 (or shoulder) of the B-nut 110. The collar engagement portion 362 of the upper body 210 may be similarly configured. The collar engagement portions 362-364 may closely surround the collar 160 to advantageously prevent the mist capture device 200 from slipping off the B-nut 110 during rotation without interrupting the rotating motion of the mist capture device 200.

Additionally, the tube engagement portion 384 is sized to surround the tubing 130 of the B-nut fitting 100. In particular, the tube engagement portion 384 may form a semi-circular recess in the lower joining surface 222 sized to fit the tubing 130. Thus, the tube engagement portion 384 may form a portion of a circular void that surrounds the tubing 130. The tube engagement portion 382 of the upper body 210 may be similarly configured. The tube engagement portions 382-384 may closely surround the tubing 130 to advantageously encapsulate the mist enclosure 240 over an area surrounding the second side 113 of the B-nut 110 without interrupting the rotating motion of the mist capture device 200.

Figure 4A:
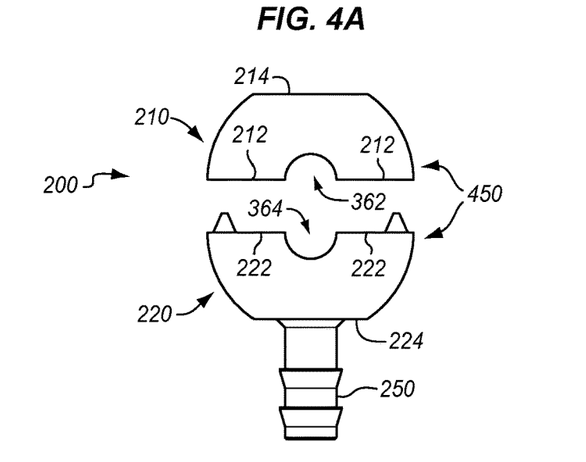
FIG. 4A is a side view of the mist capture device in an illustrative embodiment.

FIG. 4A is a side view of the mist capture device 200 in an illustrative embodiment. FIG. 4A shows the collar engagement portions 362-364 may form a first circular void at a first end of the mist capture device 200 body to fit around the collar 160 between the fitting 120 and the first side 111 of the B-nut 110, thereby preventing the mist capture device 200 from slipping off the B-nut 110 during rotation. Additionally, an outer surface 450 includes parallel wrench flats 214/224 on opposite sides configured to interface with a wrench for rotating the assembled body, and the drain connector 250 extends from the lower wrench flat 224 on the outer surface 450 to drain hydraulic fluid. Still further, the upper joining surface 212 forms a face of a first piece of the body and the lower joining surface 222 forms a face of a second piece of the body.

Figure 4B:
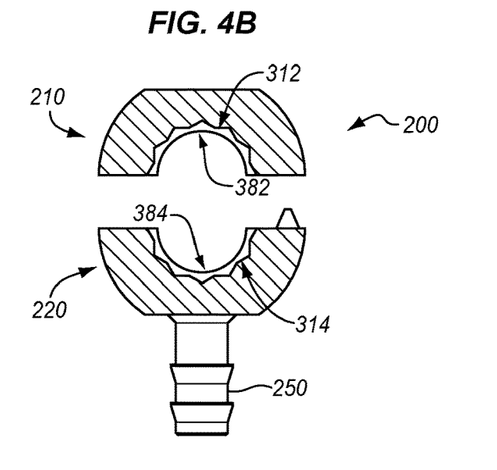
FIG. 4B is a side cross-sectional view of the mist capture device in an illustrative embodiment.

FIG. 4B is a side cross-sectional view of the mist capture device 200 in an illustrative embodiment. As shown in FIG. 4B, the tube engagement portions 382-384 may form a second circular void at a second end of the mist capture device 200 body to fit around the tubing 130, thereby enclosing the area between the internal socket surface 230 and the tube engagement portions 382-384 with the mist enclosure 240 to capture hydraulic fluid spraying from the side of the B-nut 110. The mist enclosure 240 may form a hollow cylindrical area inside a two-part body. Since the B-nut 110 generally has larger dimensions than the tubing 130 of the B-nut fitting 100, the internal socket portions 312-314 generally have larger dimensions than the tube engagement portions 382-384. In some embodiments, the internal socket portions 312-314 form a twelve-point socket surface to engage the B-nut 110.

Figure 4C:
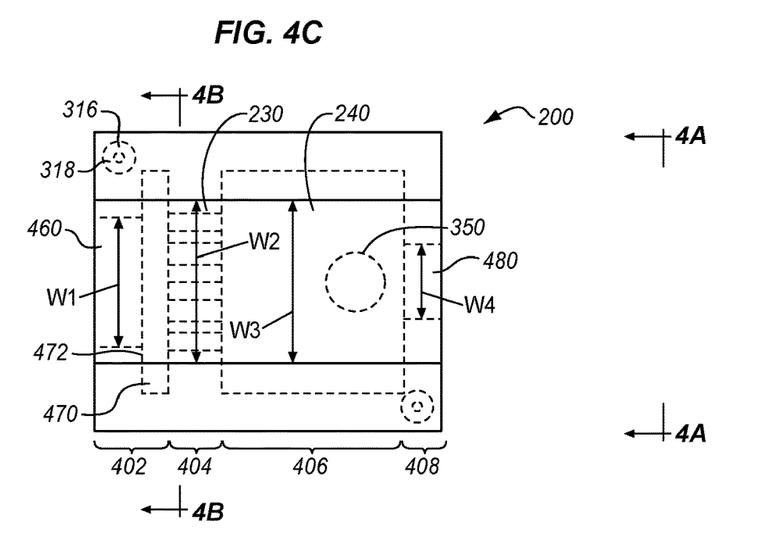
FIG. 4C is a top cross-sectional view of the mist capture device in an illustrative embodiment.

FIG. 4C is a top cross-sectional view of the mist capture device 200 in an illustrative embodiment. As shown in FIG. 4C, the mist capture device 200 includes a first end 402 to fit around the collar 160 behind the B-nut 110, a first middle portion 404 to rotationally engage the B-nut 110, a second middle portion 406 to envelop the area in front of the B-nut 110, and a second end 408 to fit around the tubing 130. The first end 402 includes a circular collar void 460 formed by the collar engagement portions 362-364 described above and having a diameter W1 extending along the width of the mist capture device 200.

The first middle portion 404 after the first end 402 includes the internal socket surface 230 having a diameter W2 slightly larger than the diameter W1 of the circular collar void 460. Accordingly, a B-nut shoulder engagement gap 470 between the circular collar void 460 and the internal socket surface 230 (and formed by the B-nut shoulder engagement portions 372-374) provides an inner lip 472 to flank the first side 111 of the B-nut 110 to prevent the B-nut 110 from slipping out of the first end 402 while being rotatably loosened. Additionally, the length of the first end 402 including the circular collar void 460 may be sized to correspond with an exposed length of the collar 160 when the B-nut fitting 100 is installed. Thus, the length of the first end 402 (perpendicular to width or diameter W1) may define the position to which the B-nut 110 may be rotatably tightened toward the fitting 120, thereby facilitating installation of the B-nut fitting 100 by preventing over rotation of the B-nut 110. The B-nut shoulder engagement gap 470 may also collect relatively small amounts of hydraulic fluid that may seep from the first side 111 of the B-nut as it is loosened.

The second middle portion 406 includes the mist enclosure 240 which may generally form a hollow cylindrical shape having diameter W3 and a length extending between the first middle portion 404 and the second end 408. Generally, the diameter W3 of the mist enclosure 240 is larger than the diameter W2 of the internal socket surface 230. Additionally, the length of the second middle portion 406 including the mist enclosure 240 may be larger than that of the first end 402, first middle portion 404, and second end 408. In some embodiments, the length of the second middle portion 406 including the mist enclosure 240 is larger than a combined length of the first end 402, first middle portion 404, and second end 408.

The second end 408 includes a second circular collar void 480 formed by the tube engagement portions 382-384 described above and having a diameter W4. Generally, since the tubing 130 may be sized smaller than the collar 160 of the B-nut fitting 100, the diameter W4 of the second circular collar void 480 may be smaller than that of the diameter W1 of the circular collar void 460. Additionally, as shown by FIG. 4C, the diameters W1-W4 may be offset from another along the length of the mist capture device 200 but have aligned common centers with respect to a width of the mist capture device 200 for rotation of the B-nut fitting 100.

Figure 5:
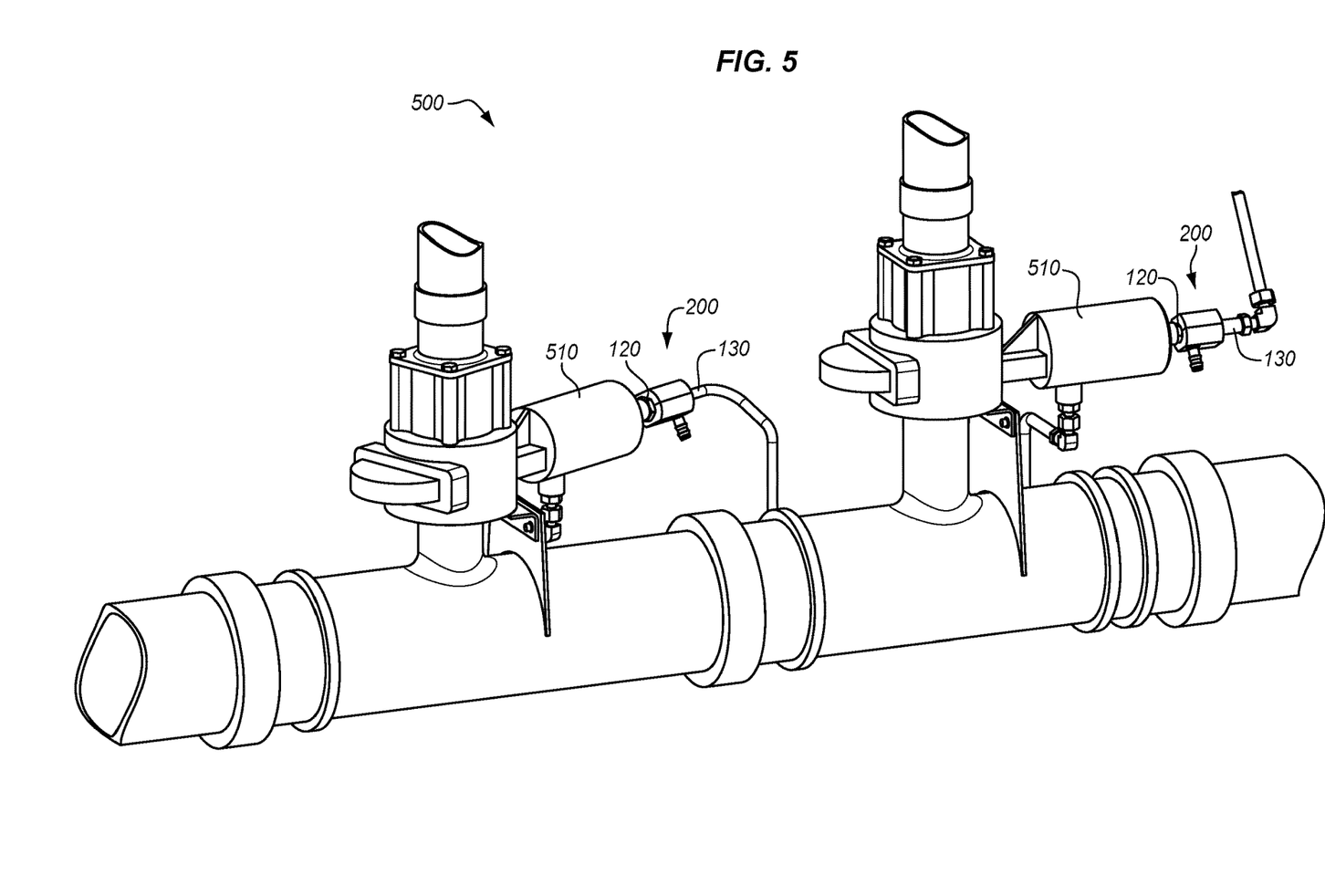
FIG. 5 illustrates a hydraulic system environment of an aircraft with mist capture devices in assembled positions and engaged with respective B-nut fittings in an illustrative embodiment.

FIG. 5 illustrates a hydraulic system environment 500 of an aircraft with mist capture devices 200 in assembled positions and engaged with respective B-nut fittings in an illustrative embodiment. In this example, the B-nut 110 (not shown in FIG. 5) is surrounded by the mist capture device 200 for loosening the B-nut 110 from its fitting 120. Moreover, the fitting 120 may be a component of a hydraulic device in the hydraulic system environment 500 such as a hydraulic tank 510. With the mist capture devices 200 rotated in a counter-clockwise motion, mist from the hydraulic fluid in the tubing 130 sprays from the B-nut and is captured inside the mist capture devices 200.

It will be appreciated that various alternative shapes and configurations of components of the mist capture device 200 other than that explicitly shown and described are possible including applications and features for variations in the B-nut fitting 100 and alternative hydraulic fittings. Although specific embodiments were described herein, the scope is not limited to those specific embodiments. Rather, the scope is defined by the following claims and any equivalents thereof.

What is claimed is:

1. A mist capture device for a hydraulic fitting, the mist capture device comprising:
a plurality of bodies configured to fit together to form an assembled body around the hydraulic fitting;
an internal socket surface formed inside the assembled body with a jagged internal perimeter configured to mate with corresponding wrench flats of the hydraulic fitting to rotate the hydraulic fitting; and
a mist enclosure formed inside the assembled body configured to capture hydraulic fluid spraying from the hydraulic fitting as the hydraulic fitting is rotated via the internal socket surface, wherein the mist enclosure includes an internal perimeter that is larger than the jagged internal perimeter of the internal socket surface such that the mist enclosure is non-nut engaging, wherein the mist enclosure includes a drain hole, and wherein the mist enclosure surrounds the hydraulic fluid spraying as the internal socket surface loosens the hydraulic fitting to collect the hydraulic fluid before it exits through the drain hole.

2. The mist capture device of claim 1 further comprising:
a barbed hose fitting to direct hydraulic fluid captured by the mist enclosure from the drain hole to an external fluid collector.

3. The mist capture device of claim 1 wherein:
the bodies are configured to fit together via one or more index pins on a first one of the bodies inserted into corresponding one or more mounting holes in a second one of the bodies.

4. The mist capture device of claim 1 wherein:
an outer surface of the assembled body includes parallel wrench flats on opposite sides configured to interface with a wrench.

5. The mist capture device of claim 1 wherein:
with the bodies fit together around the hydraulic fitting, one end of the assembled body surrounds a collar of the hydraulic fitting, and another end of the assembled body surrounds tubing of the hydraulic fitting.

6. The mist capture device of claim 1 wherein:
the mist enclosure is adjacent to the internal socket surface and includes a smooth inner surface that encloses a space in front of the nut when the assembled body is formed around the hydraulic fitting.

7. The mist capture device of claim 6 wherein:
one end of the assembled body surrounds a collar of the hydraulic fitting behind the nut to prevent the mist capture device from slipping off the hydraulic fitting during rotation.

8. An apparatus comprising:
a body to assemble around a B-nut of a hydraulic fitting;
an internal socket inside the body with a jagged internal perimeter to mate with corresponding wrench flats of the B-nut to rotate the B-nut; and
a mist enclosure adjacent to the internal socket inside the body to capture hydraulic fluid spraying out a side of the B-nut as the B-nut is loosened via rotation of the internal socket, wherein the mist enclosure includes an internal perimeter that is larger than the jagged internal perimeter of the internal socket surface such that the mist enclosure is non-nut engaging, wherein the mist enclosure includes a drain hole, and wherein the mist enclosure surrounds the hydraulic fluid spraying as the internal socket surface loosens the B-nut to collect the hydraulic fluid before it exits through the drain hole.

9. The apparatus of claim 8 further comprising:
a circular void at one end of the body that surrounds tubing engaged by the B-nut to enclose the mist enclosure over the side of the B-nut.

10. The apparatus of claim 8 further comprising:
index pins that protrude from a face of a first piece of the body; and
mounting holes in a face of a second piece of the body that receive the index pins to join the first piece and the second piece of the body around the B-nut.

11. The apparatus of claim 8 further comprising:
a barbed hose fitting on an external surface of the body; and
a drain in the mist enclosure to drain hydraulic fluid captured inside the body through the barbed hose fitting.

12. The apparatus of claim 8 further comprising:
a circular void at one end of the body that surrounds a shoulder of the B-nut to prevent the body from slipping off the B-nut during rotation.

13. The apparatus of claim 8 wherein:
the internal socket includes a twelve-point socket surface, and
the mist enclosure includes a smooth inner surface.

14. A mist capture device for a B-nut hydraulic fitting including a B-nut, a fitting, and tubing sealed by the B-nut and the fitting, the mist capture device comprising:

a two-part body configured to fit together around the B-nut, the two-part body forming:
  a first circular void to fit around a collar between the fitting and a first side of the B-nut;
  an internal socket surface with a jagged internal perimeter to mate with corresponding wrench flats of the B-nut to rotate the B-nut;
  a mist enclosure encapsulating an area facing a second side of the B-nut, wherein the mist enclosure includes an internal perimeter that is larger than the jagged internal perimeter of the internal socket surface such that the mist enclosure is non-nut engaging, wherein the mist enclosure includes a drain hole, and wherein the mist enclosure surrounds hydraulic fluid spraying as the internal socket surface loosens the B-nut to collect the hydraulic fluid before it exits through the drain hole; and
  a second circular void to fit around the tubing.

15. The mist capture device of claim 14, further comprising:
  a barbed hose fitting on an external surface of the two-part body; and
  a drain in the mist enclosure to drain hydraulic fluid captured inside the two-part body through the barbed hose fitting.

16. The mist capture device of claim 14, further comprising:
  index pins protruding from a face of a first piece of the two-part body; and
  mounting holes in a face of a second piece of the two-part body for receiving the index pins to join the first piece and the second piece around the B-nut.

17. The mist capture device of claim 14, wherein:
  the mist enclosure is a hollow cylindrical area with a smooth inner surface inside the two-part body.

18. The mist capture device of claim 14, further comprising:
  a filter fluidly coupled with the mist enclosure via a barbed hose fitting on an outer surface of the two-part body.

19. The mist capture device of claim 14, further comprising:
  a fluid tank fluidly coupled with the mist enclosure via a barbed hose fitting on an outer surface of the two-part body.

20. The mist capture device of claim 14, further comprising:
  the internal socket surface includes a first diameter larger than a second diameter of the first circular void to prevent the B-nut from slipping out of the first circular void while the B-nut is loosened via rotation of the internal socket surface.

* * * * *